United States Patent
Kim et al.

(10) Patent No.: US 10,012,539 B2
(45) Date of Patent: Jul. 3, 2018

(54) BRAGG GRATING, AND SPECTROSCOPY DEVICE INCLUDING THE BRAGG GRATING

(71) Applicants: SAMSUNG ELECTRONICS CO., LTD., Suwon-si (KR); IMEC VZW, Leuven (BE)

(72) Inventors: Dongho Kim, Seoul (KR); Jeonghwan Song, Heverlee (BE)

(73) Assignees: SAMSUNG ELECTRONICS CO., LTD., Suwon-si (KR); IMEC VZW, Leuven (BE)

( * ) Notice: Subject to any disclaimer, the term of this patent is extended or adjusted under 35 U.S.C. 154(b) by 0 days.

(21) Appl. No.: 15/208,953

(22) Filed: Jul. 13, 2016

(65) Prior Publication Data
US 2017/0153143 A1    Jun. 1, 2017

(30) Foreign Application Priority Data

Nov. 26, 2015 (KR) .......................... 10-2015-0166416

(51) Int. Cl.
| | |
|---|---|
| G02B 6/124 | (2006.01) |
| G01J 3/18 | (2006.01) |
| G02B 6/293 | (2006.01) |
| G02B 5/18 | (2006.01) |

(52) U.S. Cl.
CPC .......... *G01J 3/1895* (2013.01); *G02B 5/1861* (2013.01); *G02B 6/124* (2013.01); *G02B 6/29328* (2013.01); *G01J 2003/1847* (2013.01)

(58) Field of Classification Search
CPC ........................ G01J 2001/0496; G01J 3/1895
See application file for complete search history.

(56) References Cited

U.S. PATENT DOCUMENTS

| | | | |
|---|---|---|---|
| 6,442,312 B1 | 8/2002 | Terao et al. | |
| 6,868,208 B2 | 3/2005 | Grosso et al. | |
| 7,113,673 B2 * | 9/2006 | Lipson | G02B 6/122 |
| | | | 385/129 |

(Continued)

FOREIGN PATENT DOCUMENTS

| | | |
|---|---|---|
| KR | 10-0759812 B1 | 9/2007 |
| KR | 10-0783363 B1 | 12/2007 |

(Continued)

OTHER PUBLICATIONS

Apodized Bragg Mirror, IMEC, Oct. 30, 2015, 1 page total.

(Continued)

*Primary Examiner* — Chad H Smith
(74) *Attorney, Agent, or Firm* — Sughrue Mion, PLLC

(57) ABSTRACT

Provided are a Bragg grating and a spectroscopy device including the same. The Bragg grating is disposed at each of opposite ends of a resonator for reflecting light of a certain wavelength band and includes a core member extending from a waveguide of the resonator in a lengthwise direction of the waveguide; a plurality of first refractive members protruding from the core member and spaced apart from each other along the lengthwise direction; and a second refractive member filling spaces between the first refractive members and having a refractive index different from a refractive index of the first refractive members.

19 Claims, 8 Drawing Sheets

(56) References Cited

U.S. PATENT DOCUMENTS

| | | | |
|---|---|---|---|
| 8,385,696 B2 * | 2/2013 | Hakuta | G02B 6/0229 359/341.1 |
| 2004/0037503 A1 | 2/2004 | Hastings et al. | |
| 2004/0096156 A1 | 5/2004 | Grosso et al. | |
| 2007/0019313 A1 | 1/2007 | Mugnier et al. | |
| 2008/0080804 A1 | 4/2008 | Kim et al. | |
| 2010/0329608 A1 | 12/2010 | Ogawa et al. | |
| 2017/0167921 A1 | 6/2017 | Lee et al. | |

FOREIGN PATENT DOCUMENTS

| | | |
|---|---|---|
| KR | 10-1209627 B1 | 12/2012 |
| WO | 2010030251 A2 | 3/2010 |
| WO | 2015099764 A1 | 7/2015 |

OTHER PUBLICATIONS

Mikael Antelius et al; "An apodized SOI waveguide-to-fiber surface grating coupler for single lithography silicon photonics"; Optics Express; Feb. 14, 2011; vol. 19; No. 4; pp. 3592-3598.
Communication dated May 9, 2017 issued by the European Patent Office in counterpart European Patent Application No. 16182955.1.

* cited by examiner

BRAGG GRATING, AND SPECTROSCOPY DEVICE INCLUDING THE BRAGG GRATING

CROSS-REFERENCE TO RELATED APPLICATION

This application claims priority from Korean Patent Application No. 10-2015-0166416, filed on Nov. 26, 2015 in the Korean Intellectual Property Office, the disclosure of which is incorporated herein by reference in its entirety.

BACKGROUND

1. Field

Apparatuses and methods consistent with exemplary embodiments relate to Bragg gratings and spectroscopy devices including the Bragg gratings.

2. Description of the Related Art

Biometric technology on wearable devices allows users to measure biometric information such as blood glucose in a non-invasive manner. When the wearable devices are implemented with a spectrometer, the size of the spectrometer may have to be ultra-small to fit in the wearable devices. By implementing Fabry-Pero interferometers having different lengths as a chip by using silicon (Si)-photonics technology, an ultra-small size spectrometer may be manufactured. A Fabry-Perot interferometer includes a resonator and Bragg gratings at opposite end portions of the resonator. An important factor is to manufacture a Bragg grating having high reflectivity on the desired wavelength range of a wearable device.

SUMMARY

One or more exemplary embodiments provide Bragg gratings and spectroscopy devices including the Bragg gratings.

According to an aspect of an exemplary embodiment, there is provided a grating disposed at each of opposite ends of a resonator for reflecting light of a certain wavelength band including: a core member extending from a waveguide of the resonator in a lengthwise direction of the waveguide; a plurality of first refractive members protruding from the core member and spaced apart from each other along the lengthwise direction; and a second refractive member filling spaces between the first refractive members and having a refractive index different from a refractive index of the first refractive members.

The first refractive members may protrude from opposite sides of the core member in a width direction of the core member. At least some of pitches between the first refractive members may vary along the lengthwise direction.

At least one of a width of the core member and protruding lengths of the first refractive members may vary along the lengthwise direction. The width of the core member may gradually reduce toward a center portion of the core member along the lengthwise direction. The protruding lengths of the first refractive members may gradually increase toward the center portion of the core member along the lengthwise direction.

The first refractive members may face each other across on the core member. The width of the core member may be less than a width of the waveguide in the resonator.

Each of the core member and the first refractive members may include silicon nitride. The second refractive member may include silicon oxide.

According to an aspect of another exemplary embodiment, there is provided a grating disposed at each of opposite ends of a resonator for reflecting light of a certain wavelength band including: a core member extending from a waveguide of the resonator in a lengthwise direction of the waveguide; a plurality of first refractive members protruding from the core member; and a second refractive member filling spaces between the first refractive members, wherein pitches between the plurality of first refractive members may vary along the lengthwise direction, and wherein at least one of a width of the core member and protruding lengths of the first refractive members may vary along the lengthwise direction.

The plurality of first refractive members may protrude from opposite sides of the core member in a width direction of the core member.

A width of the core member may gradually reduce along the lengthwise direction of the core member toward a center portion of the core member, and protruding lengths of the plurality of first refractive members may gradually increase along the lengthwise direction toward the center portion of the core member.

According to an aspect of an exemplary embodiment, there is provided a spectrometer including: a resonator; and a grating disposed at each of opposite ends of the resonator and configured to reflect light of a certain wavelength band, wherein the grating may include: a core member extending from a waveguide of the resonator in a lengthwise direction of the waveguide; a plurality of first refractive members protruding from the core member and spaced apart from each other along the lengthwise direction; and a second refractive member filling spaces between the plurality of first refractive members.

The plurality of first refractive members may protrude from opposite sides of the core member in a width direction of the core member. At least some of pitches between the first refractive members may vary along the lengthwise direction.

At least one of a width of the core member and protruding lengths of the first refractive members may vary along the lengthwise direction. The width of the core member may gradually reduce toward a center portion of the core member along the lengthwise direction, and protruding lengths of the first refractive members may gradually increase toward the center portion of the core member along the lengthwise direction.

The second refractive member may cover the waveguide of the resonator, the core member, and the plurality of first refractive members. The spectroscopy units may be on a silicon substrate.

According to an aspect of another exemplary embodiment, there is provided a spectrometer including: a resonator that extends to an end point on a longitudinal axis; and a reflector disposed at the end point of the resonator, the reflector including a core member extending outwardly from the end point of the resonator on the longitudinal axis, and a plurality of pairs of arms extending from the core member to be perpendicular to the core member, wherein the plurality of pairs of arms are spaced apart from each other on the longitudinal axis by an interval.

The interval may decrease toward a center point of the core member on the longitudinal axis.

A span of the plurality of arms may increase toward a center point of the core member on the longitudinal axis.

A pair among the plurality of pairs of arms may include a first arm and a second arm. The first arm may extend from the core member in a first direction, the second arm may extend from the core member in a second direction opposite to the first direction, and the first arm and the second arm may be disposed at a same position of the core member on the longitudinal axis.

BRIEF DESCRIPTION OF THE DRAWINGS

The above and/or other aspects will be more apparent by describing certain exemplary embodiments, with reference to the accompanying drawings in which.

DETAILED DESCRIPTION

Figure 1:
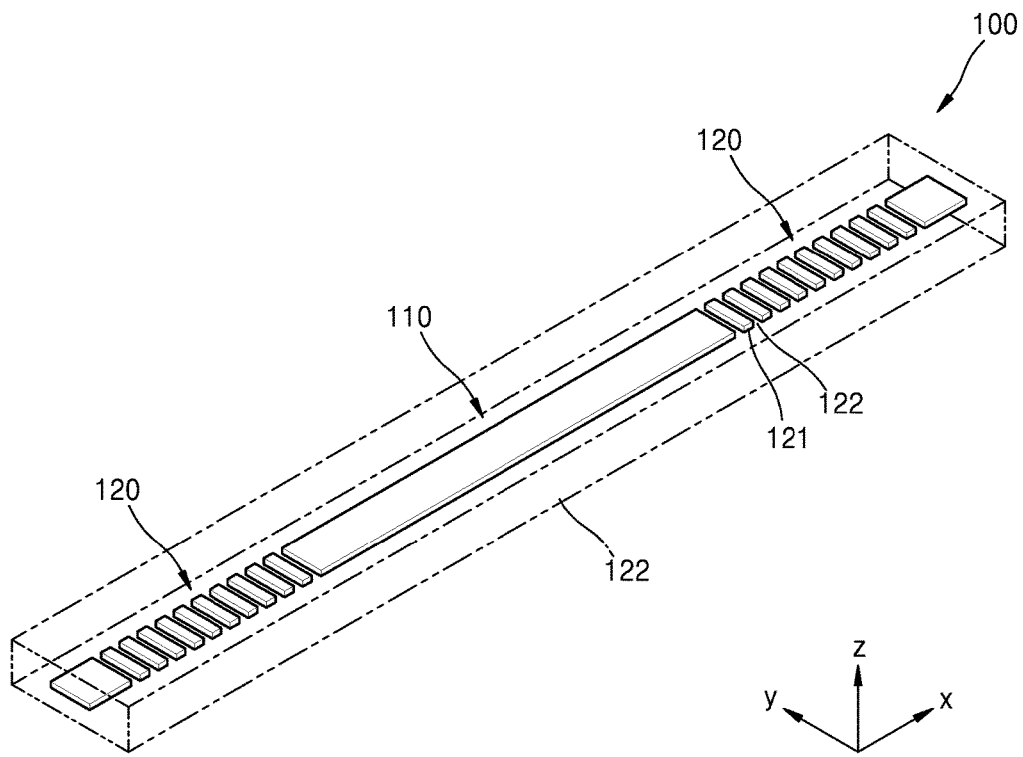
FIG. 1 is a perspective view of a Fabry-Perot interferometer having a general structure.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that when a component, such as a layer, a film, a region, or a plate, is referred to as being "on" another component, the component may be directly on the other component or intervening components may be present thereon. In addition, materials forming each layer in exemplary embodiments are examples, and thus, other materials than the examples below may be used. As used herein, the term "and/or" includes any and all combinations of one or more of the associated listed items. Expressions such as "at least one of," when preceding a list of elements, modify the entire list of elements and do not modify the individual elements of the list.

Figure 2:
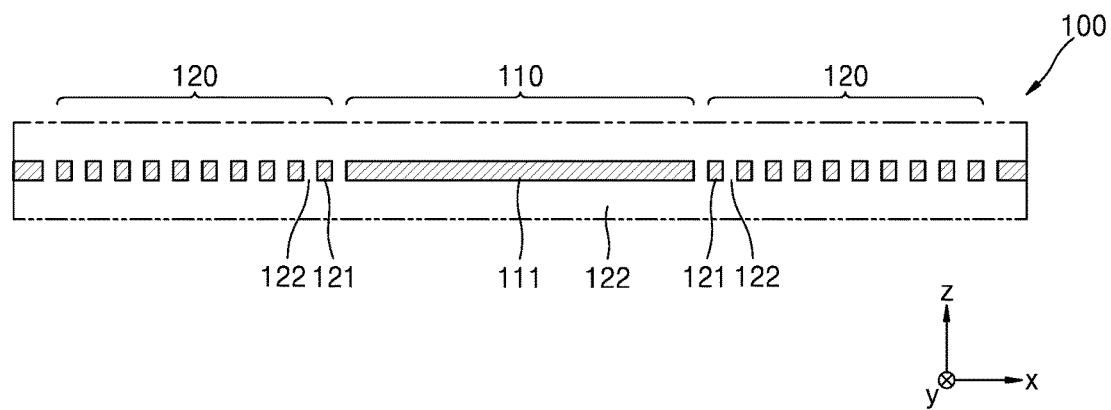
FIG. 2 is a cross-sectional view of the Fabry-Perot interferometer of FIG. 1.
Figure 3:
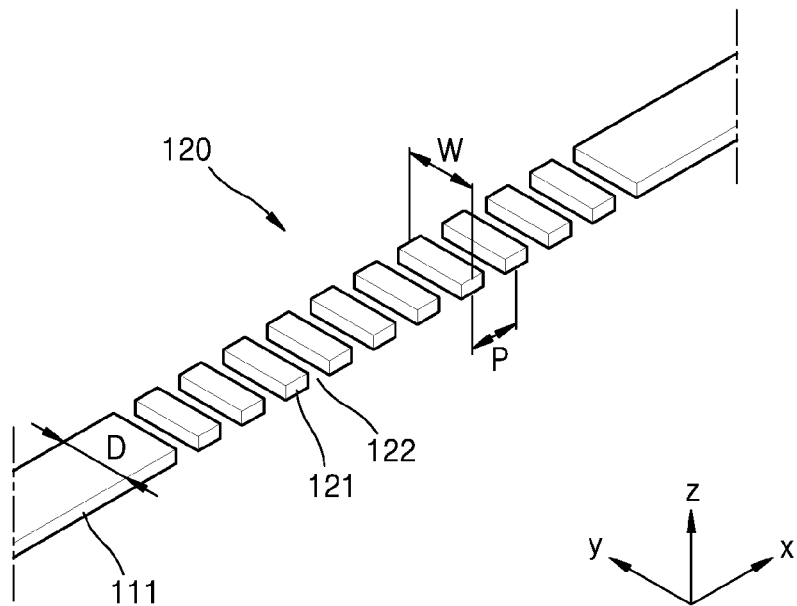
FIG. 3 is a perspective view of a Bragg grating shown in FIG. 1.

FIG. 1 is a perspective view of a Fabry-Perot interferometer 100 having a general structure, FIG. 2 is a cross-sectional view of the Fabry-Perot interferometer 100 of FIG. 1, and FIG. 3 is a perspective view of a Bragg grating 120 shown in FIG. 1.

Referring to FIGS. 1 to 3, the Fabry-Perot interferometer 100 may include a resonator 110 having a waveguide 111 of a predetermined length, and Bragg gratings 120 at opposite ends of the resonator 110. The waveguide 111 of the resonator 110 may include, for example, silicon nitride.

The Bragg grating 120 may reflect light of a predetermined wavelength band. The Bragg grating 120 may include a plurality of first refractive members 121 arranged in a lengthwise direction (e.g., x-direction in FIG. 1) of the resonator 110, and a second refractive member 122 filling spaces between the first refractive members 121. A width W of the Bragg grating 120 in a y-direction may be equal to a width D of the waveguide 111 in the y-direction of the resonator 110.

The first refractive members 121 may have a refractive index different from a refractive index of the second refractive member 122. For example, the first refractive members 121 may include silicon nitride, and the second refractive member 122 may include silicon oxide. The second refractive member 122 may cover the waveguide 111 of the resonator 110 and the Bragg gratings 120. The first refractive members 121 are spaced apart from each other along the lengthwise direction of the resonator 110. Intervals between the first refractive members 121, that is, pitches P between the first refractive members 121, may be constant along the lengthwise direction of the Bragg grating 120.

In the Bragg grating 120 having the above structure, materials having different refractive indexes, for example, the first refractive members 121 including the silicon nitride and the second refractive member 122 including silicon oxide are disposed, and the first and second refractive members are formed and arranged to create an interference pattern between waves. The Bragg grating 120 having the above structure may reflect particular wavelengths of light and have a high reflectivity at the particular wavelengths. However, the Bragg grating 120 may not have a high reflectivity with respect to a wide wavelength band.

Figure 4:
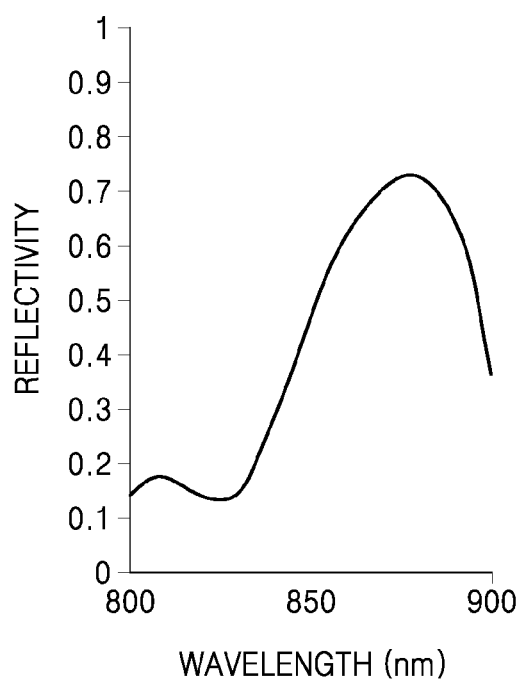
FIG. 4 is a diagram showing reflectivity of the Bragg grating of FIG. 3.

FIG. 4 is a graph of reflectivity of the Bragg grating 120 of FIG. 3 with respect to a wavelength band of 800 nm to 900 nm. The first refractive members 121 and the second refractive member 122 forming the Bragg grating 120 respectively include silicon nitride and silicon oxide, and pitches P between the first refractive members 121 are 290 nm. Referring to FIG. 4, within a wavelength band of 800 nm to 830 nm, reflectivity is very low, that is, 20% or less. Therefore, it is difficult to obtain high reflectivity with respect to the wavelength band of 800 nm to 830 nm by using the Bragg grating 120 of FIG. 3. In particular, an ultra-small size spectroscopy device that is to be implemented as a wearable device has to use a wavelength band having a width of 100 nm or greater, and thus, the Bragg grating 120 having the above described structure may not be suitable for the ultra-small size spectroscopy device.

Figure 5:
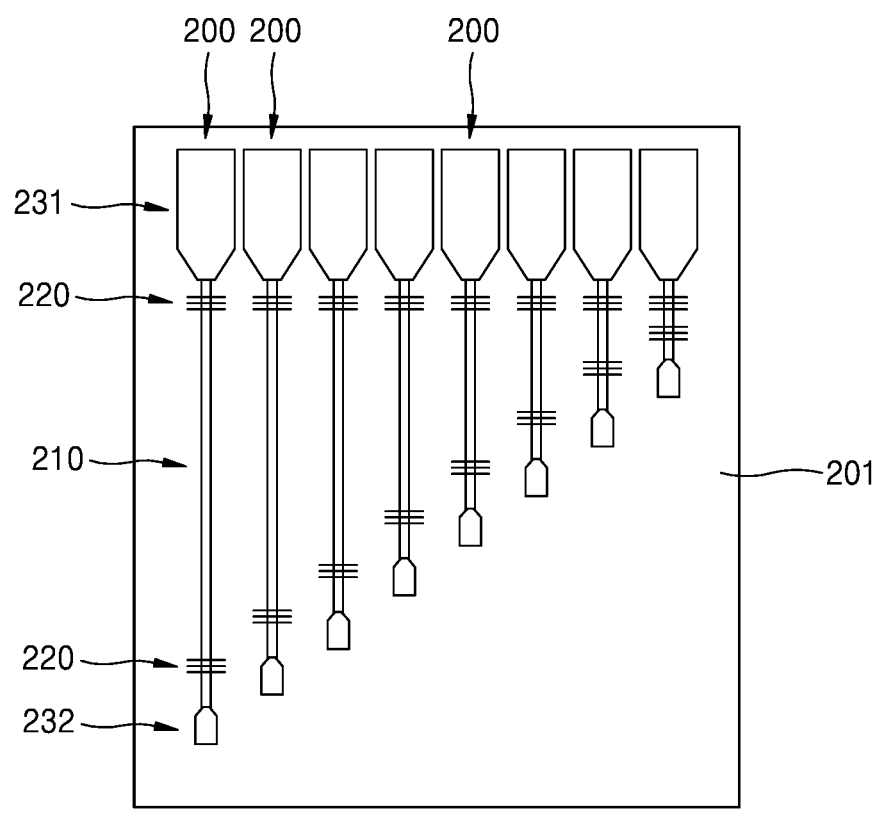
FIG. 5 is a plan view of a spectroscopy device according to an exemplary embodiment.

FIG. 5 is a plan view of a spectroscopy device according to an exemplary embodiment.

Referring to FIG. 5, the spectroscopy device includes a plurality of spectroscopy units 200 provided on a substrate 201. Here, the substrate 201 may be, for example, a silicon substrate, but is not limited thereto. In the exemplary embodiment, each of the spectroscopy units 200 may include a Fabry-Perot interferometer, but the exemplary embodiment is not limited thereto.

Each of the spectroscopy units 200 may include a resonator 210, and Bragg gratings (e.g., reflector) 220 provided at opposite ends of the resonator 210. The Bragg grating 220 provided at a first end of the resonator 210 may be connected to an input coupler 231, through which light is incident, and the Bragg grating 210 provided at a second end of the resonator 210 may be connected to an output coupler 232 through which light is emitted. The first end of the resonator 210 may oppose the second end of the resonator 210.

At least some of the spectroscopy units 200 may include resonators 210 having different lengths from each other. In FIG. 5, a sequence of the spectroscopy units 200 are arranged in a y-direction, and the lengths of the resonators 210 of the spectroscopy units 200 gradually increase along the y-direction. The spectroscopy device having the above structure may be integrated on, for example, a silicon substrate, to be manufactured as a fine chip.

Figure 6:
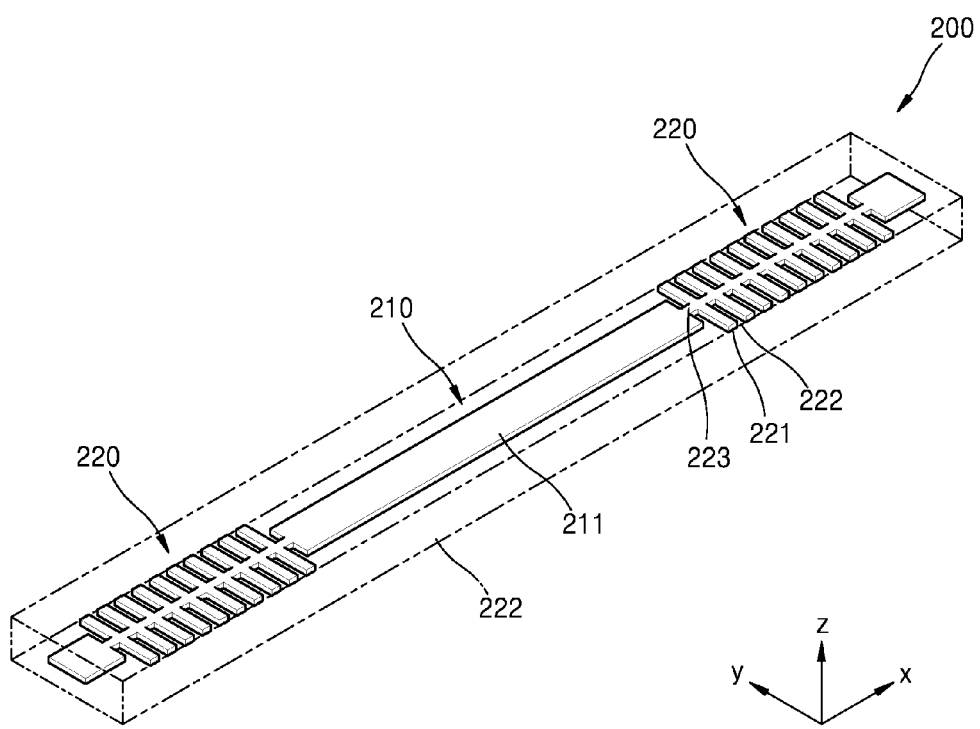
FIG. 6 is a perspective view of a spectroscopy unit shown in FIG. 5.

FIG. 6 is a perspective view of the spectroscopy unit 200 of FIG. 5.

Referring to FIG. 6, the spectroscopy unit 200 includes the resonator 210 having a predetermined length and the Bragg gratings 220 at opposite ends of the resonator 210. The resonator 210 may include a waveguide 211 including a predetermined medium for making light proceed therein. The waveguide 211 may have a thickness of about 100 nm to 200 nm and a width D of about 200 nm to about 900 nm, for example. However, the exemplary embodiment is not limited thereto, that is, the thickness and the width of the waveguide 211 may vary. The waveguide 211 may include, for example, silicon nitride, but is not limited thereto, that is, the waveguide 211 may include other various materials.

Figure 7:
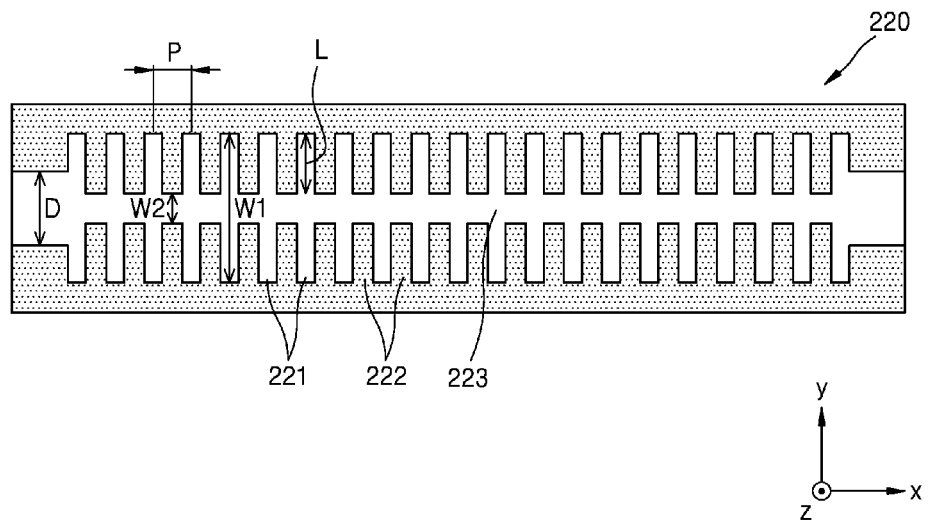
FIG. 7 is an internal plan view of a Bragg grating shown in FIG. 6.

FIG. 7 is an internal plan view of the Bragg grating 220 of FIG. 6.

Referring to FIG. 7, the Bragg grating 220 includes a core member 223, a plurality of first refractive members 221, and a second refractive member 222. The core member 223 may extend from the waveguide 211 of the resonator 210 in a lengthwise direction (i.e., x-direction of FIG. 7). The core member 223 may be integrally formed with the waveguide 211 of the resonator 210. The core member 223 may include the same material as that included in the waveguide 211 of the resonator 210. For example, the core member 223 may include silicon nitride, but is not limited thereto. Otherwise, the core member 223 may include a different material from that of the waveguide 211 of the resonator 210.

The first refractive members 221 may protrude from the core member 223. The first refractive members 221 may include a plurality of pairs of arms. Each pair of arms extends outwardly from the core member 223 to be in parallel to each other and perpendicular to the core member 223. The core member 223 may hold the plurality of pairs of arms in fixed positions on the core member 223. In greater detail, the first refractive members 221 may protrude from opposite sides of the core member 223 in a width direction of the core member 223 (i.e., y-direction in FIG. 7). The first refractive members 221 may be spaced apart from each other in the lengthwise direction of the core member 223. Here, the first refractive members 221 may face each other across the core member 223 when viewed from the top of the spectroscopy unit 200, but are not limited thereto.

Intervals between the first refractive members 221, that is, pitches P between the first refractive members 221, in the lengthwise direction of the core member 223 may be constant. The first refractive members 221 may be integrally formed with the core member 223. The first refractive members 221 may include the same material as that of the core member 223. For example, the first refractive members 221 may include silicon nitride, but are not limited thereto.

The second refractive member 222 is provided to fill spaces between the first refractive members 221. The second refractive member 222 may include a material having a refractive index that is different from those of the first refractive members 221. For example, the second refractive member 222 may include silicon oxide, but is not limited thereto. The second refractive member 222 may be provided to cover the waveguide 211 of the resonator 210 and the first refractive members 221.

A width W1 of the Bragg grating 220 may be greater than the width D of the waveguide 211 of the resonator 210. The width W1 may be also referred to as a span of the Bragg grating 220. In addition, a width W2 of the core member 223 may be less than the width D of the waveguide 211 of the resonator 210. Here, the width W1 of the Bragg grating 220 may correspond to a sum of protruding lengths L of the two first refractive members 221 that protrude toward opposite directions and the width W2 of the core member 223. In the exemplary embodiment, the width W1 of the Bragg grating 220 and the width W2 of the core member 223 may be constant along the lengthwise direction of the core member 223. Accordingly, the protruding lengths L of the first refractive members 221 may be constant along the lengthwise direction of the core member 223.

Figure 8:
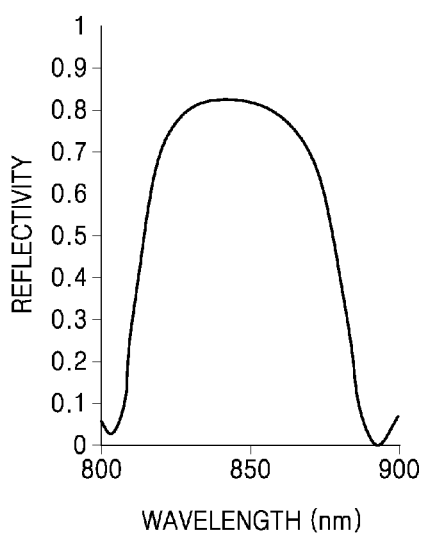
FIG. 8 is a diagram showing reflectivity of the Bragg grating of FIG. 7.

FIG. 8 is a graph of reflectivity of the Bragg grating 220 of FIG. 7 with respect to a wavelength band of 800 nm to 900 nm. Here, the first refractive members 221 and the second refractive member 222 included in the Bragg grating 220 respectively include silicon nitride and silicon oxide, and pitches P between the first refractive members 221 are 290 nm. In addition, the width D of the waveguide 211, the width W1 of the Bragg grating 220, and the width W2 of the core member 223 are respectively 510 nm, 1000 nm, and 200 nm.

When comparing the graph of FIG. 4 with the graph of FIG. 8, the Bragg grating 220 of FIG. 7 may achieve higher reflectivity than the Bragg grating 120 of FIG. 3. In detail, referring to FIG. 3, the Bragg grating 120 exhibits low reflectivity with respect to the wavelength band of 800 nm to 830 nm. However, referring to FIG. 8, the Bragg grating 220 of FIG. 7 exhibits high reflectivity with respect to the wavelength band of 800 nm to 830 nm, as well. As described above, the Bragg grating 220 according to the exemplary embodiment may achieve high reflectivity with respect to a wider wavelength band than that of the Bragg grating 120 of FIG. 3.

Figure 9:
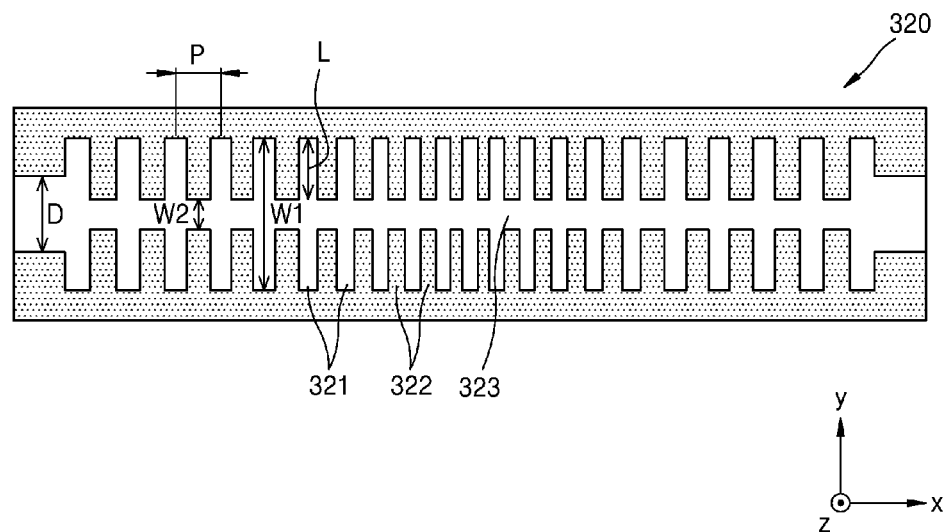
FIG. 9 is an internal plan view of a Bragg grating according to another exemplary embodiment.

FIG. 9 is an internal plan view of a Bragg grating 320 according to another exemplary embodiment.

Referring to FIG. 9, the Bragg grating 320 includes a core member 232, a plurality of first refractive members 321, and a second refractive member 322. The core member 323 may extend from the waveguide 211 of the resonator 210 (see FIG. 6) in a lengthwise direction of the resonator 210. The core member 323 may be integrally formed with the waveguide 211 of the resonator 210. The core member 323 may include the same material as that of the waveguide 211 of the resonator 210, but is not limited thereto.

The first refractive members 321 may protrude from the core member 323. The first refractive members 321 may protrude from opposite sides of the core member 323 in a width direction of the core member 323, and may be spaced apart from each other along a lengthwise direction of the core member 323. The first refractive members 321 may be integrally formed with the core member 323. The second refractive member 322 may be provided to fill spaces between the first refractive members 321. The second refractive member 323 may include a material having a refractive index that is different from that of the first refractive members 321. The second refractive member 322 may be provided to cover the waveguide 211 of the resonator 210 and the first refractive devices 321.

A width W1 of the Bragg grating 320 may be greater than the width D of the waveguide 211 of the resonator 210. In addition, a width W2 of the core member 323 may be less than the width D of the waveguide 211 of the resonator 210. The width W1 of the Bragg grating 320 and the width D2 of the core member 323 may be constant along the lengthwise direction of the core member 323. Therefore, protruding lengths L of the first refractive members 321 may be constant along the lengthwise direction of the core member 323.

Unlike the previous exemplary embodiment, intervals between the first refractive members 321, that is, pitches P between the first refractive members 321, may vary along the lengthwise direction of the core member 323. That is, at least some of the pitches P between the first refractive members 321 may vary along the lengthwise direction of the core member 323. FIG. 9 exemplarily shows a case in which the pitches P between the first refractive members 321 are gradually reduced toward a center portion of the core member 323. However, the exemplary embodiment is not limited thereto, that is, the pitches P between the first refractive members 321 may vary in various manners along the lengthwise direction of the core member 323.

Figure 10:
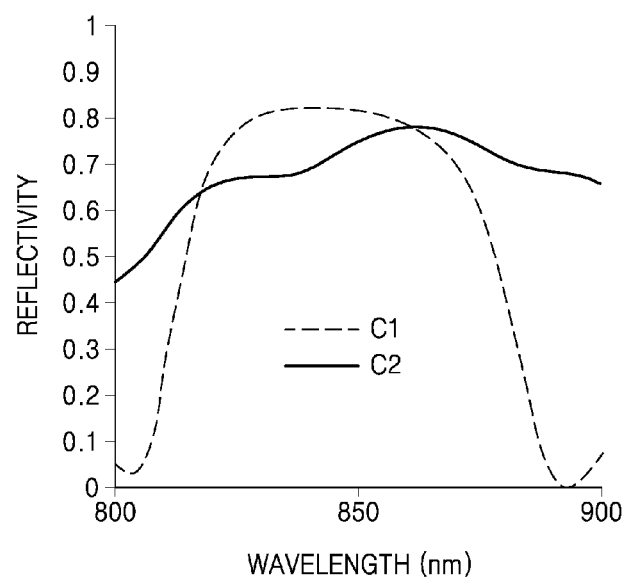
FIG. 10 is a graph of a reflectivity of the Bragg grating of FIG. 7 with respect to reflectivity of the Bragg grating of FIG. 9.

FIG. 10 is a graph of the reflectivity of the Bragg grating 220 of FIG. 7 versus a reflectivity of the Bragg grating 320 of FIG. 9 with respect to the wavelength band of 800 nm to 900 nm. Here, a curve C1 denotes the reflectivity of the Bragg grating 220 of FIG. 7, in which the pitches P between the first refractive members 221 are constant, and a curve C2 denotes the reflectivity of the Bragg grating 320 of FIG. 9, in which the pitches P between the first refractive members 321 vary.

The first refractive members 221 and 321 and the second refractive members 222 and 322 in the Bragg gratings 220 and 320 respectively include silicon nitride and silicon oxide. In addition, the width D of the waveguide 211, the widths W1 of the Bragg gratings 220 and 320, and the widths W2 of the core members 223 and 323 are respectively 510 nm, 1000 nm, and 200 nm. In the Bragg grating 220 of FIG. 7, the pitches P between the first refractive members 221 are 290 nm. In addition, in the Bragg grating 320 of FIG. 9, a minimum pitch between the first refractive members 321 is 250 nm, and the pitch varies by 2 nm.

Referring to FIG. 10, the Bragg grating 320 of FIG. 9, in which the pitches P between the first refractive members 321 vary, exhibits high reflectivity with respect to a wider wavelength band than in the Bragg grating 220 of FIG. 7, in which the pitches P between the first refractive members 221 are constant. Therefore, high reflectivity may be obtained with respect to wide wavelength band by varying the pitches P between the first refractive members 321.

Figure 11:
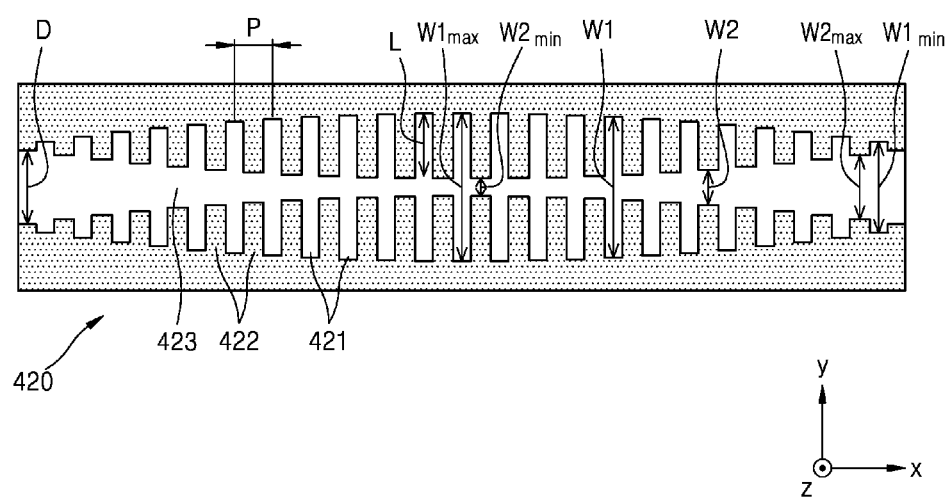
FIG. 11 is an internal plan view of a Bragg grating according to another exemplary embodiment.

FIG. 11 is an internal plan view of a Bragg grating 420 according to another exemplary embodiment.

Referring to FIG. 11, the Bragg grating 420 includes a core member 423, a plurality of first refractive members 421, and a second refractive member 422. The core member 423 may extend from the waveguide 211 of the resonator 210 (see FIG. 6) in a lengthwise direction (i.e., x-direction in FIG. 11). The core member 423 may be integrally formed with the waveguide 211 of the resonator 210. The core member 423 may include the same material as that of the waveguide 211 of the resonator 210. For example, the core member 423 may include silicon nitride, but is not limited thereto. Otherwise, the core member 423 may include a material different from that of the waveguide 211 of the resonator 210.

The first refractive members 421 may protrude from the core member 423. Here, the first refractive members 421 may protrude from opposite sides of the core member 423 in a width direction of the core member 423 (i.e., y-direction in FIG. 11). The first refractive members 421 may be spaced apart from each other along the lengthwise direction of the core member 423. Here, the first refractive members 421 may be arranged facing each other based on the core member 423, but are not limited thereto. The first refractive members 421 may be integrally formed with the core member 423. The first refractive members 421 may include the same material as that of the core member 423. For example, the first refractive members 421 may include silicon nitride, but is not limited thereto.

The second refractive member 422 may be provided to fill spaces between the first refractive members 421. The second refractive member 422 may include a material having a different refractive index from that of the first refractive members 421. For example, the second refractive member 422 may include silicon oxide, but is not limited thereto. The second refractive member 422 may be provided to cover the waveguide 211 of the resonator 210 and the first refractive members 421.

The width W1 of the Bragg grating 420 may be greater than the width D of the waveguide 211 of the resonator 210. In addition, the width W2 of the core member 423 may be less than the width D of the waveguide 211 of the resonator 210. Here, the width W1 of the Bragg grating 420 may correspond to a sum of the protruding lengths L of the two first refractive members 421 that protrude in opposite directions to each other and the width W2 of the core members 423, as described above.

At least one of the width W2 of the core member 423 and the protruding lengths L of the first refractive member 421 may vary along the lengthwise direction of the core member 423. In more detail, the width W2 of the core member 423 may be gradually reduced from opposite ends thereof toward a center portion thereof. In addition, the width W1 of the Bragg grating 420 may be gradually increased from the opposite ends of the core member 423 toward the center portion of the core member 423. The width W2 of the core member 423 has a maximum value $W2_{max}$ at the ends of the core member 423 and has a minimum value $W2_{min}$ at the center of the core member 423 in the lengthwise direction (i.e., x-direction). The width W1 of the core member 423 has a maximum value $W1_{max}$ at the center of the core member 423 and has a minimum value $W1_{min}$ at the center of the core member 423 in the lengthwise direction. Accordingly, the protruding lengths L of the first refractive members 421 gradually increase from the opposite ends of the core member 423 toward the center portion of the core member 423.

The intervals between the first refractive members 421, that is, the pitches P between the first refractive members 421, may vary along the lengthwise direction of the core member 423. That is, at least some of the pitches P between the first refractive members 421 may vary along the lengthwise direction of the core member 423. FIG. 11 exemplarily shows that the pitches P between the first refractive members 421 are gradually reduced toward the center portion of the core member 423. However, the exemplary embodiment is not limited to the above example, that is, the pitches P between the first refractive members 421 may vary in various manners along the lengthwise direction of the core member 423.

Figure 12:
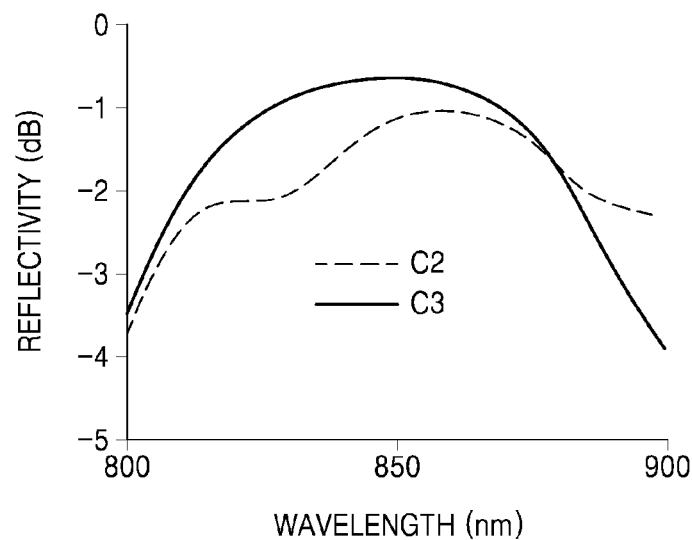
FIG. 12 is a graph of reflectivity of the Bragg grating of FIG. 9 with respect to reflectivity of the Bragg grating of FIG. 11.

FIG. 12 is a graph of the reflectivity of the Bragg grating 320 shown in FIG. 9 versus a reflectivity of the Bragg grating 420 of FIG. 11 with respect to a wavelength band of 800 nm to 900 nm. Here, the curve C2 denotes the reflectivity of the Bragg grating 320 of FIG. 9, and a curve C3 denotes the reflectivity of the Bragg grating 420 of FIG. 11. In FIG. 12, the reflectivity is expressed in units of decibels dB.

The first refractive members 321 and 421 and the second refractive members 322 and 422 in the Bragg gratings 320 and 420 respectively include silicon nitride and silicon oxide. In the Bragg grating 320 of FIG. 9, the width D of the waveguide 211, the width W1 of the Bragg grating W1, and the width W2 of the core member 323 are respectively 510 nm, 1000 nm, and 200 nm. In addition, the minimum pitch between the first refractive members 321 is 250 nm, and the pitch varies by 2 nm. In the Bragg grating 420 of FIG. 11, the width D of the waveguide 211 is 510 nm, and a maximum width $W1_{max}$ and a minimum width $W1_{min}$ of the Bragg grating 420 are respectively 1100 nm, and 670 nm. In addition, a maximum width $W2_{max}$ and a minimum width $W2_{min}$ of the core member 423 are respectively 430 nm and 130 nm. The minimum pitch between the first refractive members 421 is 250 nm, and the pitch varies by 2 nm.

Referring to FIG. 12, the Bragg grating 420 of FIG. 11, in which the width W1 of the Bragg grating 420 varies, exhibits higher reflectivity than the Bragg grating 320 of FIG. 9 having the constant width. Therefore, high reflectivity may be implemented by increasing the width W1 of the Bragg grating 420 toward the center portion of the Bragg grating 420 and reducing the width W2 of the core member 423 toward the center portion of the Bragg grating 420.

Figure 13:
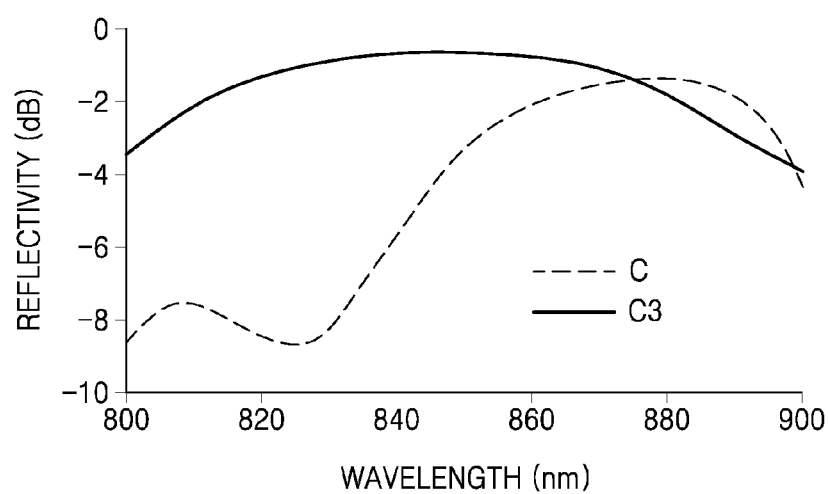
FIG. 13 is a graph of reflectivity of the Bragg grating of FIG. 4 with respect to reflectivity of the Bragg grating of FIG. 11.

FIG. 13 is a graph of the reflectivity of the Bragg grating 120 of FIG. 3 and the Bragg grating 420 of FIG. 11 with respect to the wavelength band of 800 nm to 900 nm. Here, a curve C denotes the reflectivity of the Bragg grating 120 of FIG. 3, and the curve C3 denotes the reflectivity of the Bragg grating 420 of FIG. 11. In FIG. 13, the reflectivity is expressed in the unit of decibel (dB). Referring to FIG. 13, the Bragg grating 420 of FIG. 11 exhibits higher reflectivity with respect to a wider wavelength band than in the Bragg grating 12 of FIG. 4.

In the Bragg grating 420 of FIG. 11, the width of the core member 423 is gradually reduced toward the center portion of the Bragg grating 420, and the protruding lengths L of the first refractive members 421 gradually increase toward the center portion of the Bragg grating 420 so that the width W1 of the Bragg grating 420 gradually increases toward the center portion of the Bragg grating 420. Alternatively, the width W1 of the Bragg grating 420 may vary by changing the protruding lengths L of the first refractive members 421 while maintaining the width W2 of the core member 423 constantly, or by changing the width W2 of the core member 423 while maintaining the protruding lengths L of the first refractive members 421 constantly. In addition, the pitches P between the first refractive members 421 may be constant.

As described above, when the Bragg grating includes the core member, the plurality of first refractive members protruding from the core member to be spaced apart from each other, and the second refractive member filling the spaces between the first refractive members, the high reflectivity may be obtained with respect to a wavelength band of a desired width. Here, the higher reflectivity with respect to the wider wavelength band may be obtained by varying the pitches between the first refractive members or varying the width of the Bragg grating. Also, the materials included in the first refractive members and the second refractive member may be variously selected in order to obtain higher reflectivity with respect to the visible ray band or other infrared-ray band, and the pitches between the first refractive members or the width of the Bragg grating may be set variously. Accordingly, the spectroscopy device that is manufactured by integrating the spectroscopy units including the above Bragg gratings on a substrate may have improved performance. In addition, the spectroscopy device may be manufactured as a small-sized chip that may be loaded in, for example, a non-invasive blood glucose sensor, and may be implemented as a wearable device.

The foregoing exemplary embodiments are merely exemplary and are not to be construed as limiting. For example, the spectroscopy unit 200 may be implemented with any type of reflectors rather than being limited to a Bragg grating.

The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A Bragg grating disposed at each of opposite ends of a resonator for reflecting light of a certain wavelength band, the Bragg grating comprising:
   a core member extending from a waveguide of the resonator in a lengthwise direction of the waveguide;
   a plurality of first refractive members protruding from the core member and spaced apart from each other along the lengthwise direction; and
   a second refractive member filling spaces between the first refractive members and having a refractive index different from a refractive index of the first refractive members,
   wherein the second refractive member comprises a solid material, and
   wherein a width of the waveguide is greater than a width of the core member and is less than widths of the plurality of first refractive members.

2. The Bragg grating of claim 1, wherein the first refractive members protrude from opposite sides of the core member in a width direction of the core member.

3. The Bragg grating of claim 2, wherein pitches between the first refractive members vary along the lengthwise direction.

4. The Bragg grating of claim 2, wherein at least one of a width of the core member and protruding lengths of the first refractive members varies along the lengthwise direction.

5. The Bragg grating of claim 4, wherein the width of the core member gradually reduces toward a center portion of the core member along the lengthwise direction.

6. The Bragg grating of claim 5, wherein the protruding lengths of the first refractive members gradually increase toward the center portion of the core member along the lengthwise direction.

7. The Bragg grating of claim 1, wherein the first refractive members face each other across the core member.

8. The Bragg grating of claim 1, wherein each of the core member and the first refractive members comprises silicon nitride.

9. The Bragg grating of claim 8, wherein the second refractive member comprises silicon oxide.

10. A spectrometer comprising:
a resonator; and
a Bragg grating disposed at each of opposite ends of the resonator and configured to reflect light of a certain wavelength band,
wherein the Bragg grating comprises:
- a core member extending from a waveguide of the resonator in a lengthwise direction of the waveguide;
- a plurality of first refractive members protruding from the core member and spaced apart from each other along the lengthwise direction; and
- a second refractive member filling spaces between the plurality of first refractive members,
wherein the second refractive member comprises a solid material, and
wherein a width of the waveguide is greater than a width of the core member and is less than widths of the plurality of first refractive members.

11. The spectrometer of claim 10, wherein the plurality of first refractive members protrude from opposite sides of the core member in a width direction of the core member.

12. The spectrometer of claim 11, wherein pitches between the first refractive members vary along the lengthwise direction.

13. The spectrometer of claim 11, wherein at least one of a width of the core member and protruding lengths of the first refractive members varies along the lengthwise direction.

14. The spectrometer of claim 13, wherein the width of the core member gradually reduces toward a center portion of the core member along the lengthwise direction, and protruding lengths of the first refractive members gradually increase toward the center portion of the core member along the lengthwise direction.

15. The spectrometer of claim 10, wherein the second refractive member covers the waveguide of the resonator, the core member, and the plurality of first refractive members.

16. A spectrometer comprising:
a resonator that extends to an end point on a longitudinal axis; and
a reflector disposed at the end point of the resonator, the reflector including a core member extending outwardly from the end point of the resonator on the longitudinal axis, a plurality of pairs of arms extending from the core member to be perpendicular to the core member, and a refractive member having a refractive index which is different from a refractive index of the core member and comprising a solid material,
wherein the plurality of pairs of arms are spaced apart from each other on the longitudinal axis by an interval, and
wherein a width of the resonator is greater than a width of the core member and is less than widths of the plurality of pairs of arms.

17. The spectrometer of claim 16, wherein the interval decreases toward a center point of the core member on the longitudinal axis.

18. The spectrometer of claim 16, wherein a span of the plurality of arms increases toward a center point of the core member on the longitudinal axis.

19. The spectrometer of claim 16, wherein a pair among the plurality of pairs of arms comprises a first arm and a second arm,
the first arm extends from the core member in a first direction,
the second arm extends from the core member in a second direction opposite to the first direction, and
the first arm and the second arm are disposed at a same position of the core member on the longitudinal axis.

* * * * *